United States Patent [19]

Richardelli et al.

[11] Patent Number: 4,867,819

[45] Date of Patent: Sep. 19, 1989

[54] METHOD AND APPARATUS FOR FABRICATING MODULAR BUILDING FLOOR ASSEMBLIES

[75] Inventors: Joseph Richardelli, Fredericksburg, Va.; Robert E. Thompson, Hebron, Ohio

[73] Assignee: Cardinal Industries, Inc., Reynoldsburg, Ohio

[21] Appl. No.: 82,476

[22] Filed: Aug. 7, 1987

[51] Int. Cl.[4] .................................... B32B 7/08

[52] U.S. Cl. ............................ 156/92; 156/351; 156/364; 156/556; 156/566

[58] Field of Search .............. 156/92, 556, 557, 559, 156/560, 351, 357, 364, 566; 227/14, 152; 29/564.1, 564.2

[56] References Cited

U.S. PATENT DOCUMENTS

| | | | |
|---|---|---|---|
| 3,537,168 | 11/1970 | Carroll | 227/152 |
| 3,688,965 | 9/1972 | Kellner et al. | 227/152 |
| 3,711,007 | 1/1973 | Fry | 227/152 |
| 4,133,097 | 1/1979 | Slade | 156/559 |
| 4,305,538 | 12/1981 | Schultz | 227/152 |
| 4,320,921 | 5/1982 | White | 227/152 |
| 4,403,724 | 9/1983 | Bardenstein | 227/152 |
| 4,463,887 | 8/1984 | Bloys | 156/92 |

*Primary Examiner*—Merrell C. Cashion, Jr.
*Attorney, Agent, or Firm*—Porter, Wright, Morris & Arthur

[57] ABSTRACT

Laterally spaced apart longitudinal frame mebmers are advanced to a frame assembly station by infeed drive units. Transverse frame members are advanced to the frame assembly table by laterally disposed sweep platforms and by diverter tables disposed above the frame assembly station. Automatic nailing assemblies on opposite lateral sides of the assembly table drive nails into the longitudinal frame members and transverse members disposed therebetween. Positioning of the transverse members is effected by computer controlled, reciprocative, joist-engaging stops downstream of the frame assembly table. Laterally spaced apart guide rails carry the frame workpiece to a glue-applying station equipped with a laterally movable nozzle and a pair of laterally spaced apart stationary nozzles. A frame indexer disposed below the glue-applying station advances and positions the workpiece under a sheet-placing station. The sheet placer positions the covering material so that abutting edges of adjacent sheets are disposed over the selected transverse frame members. An assembly indexer advances the frame and sheet material assembly to a sheet-fastening station and holds the transverse member bearing the abutting edge portions of the sheet material against reciprocative stops mounted in the base of the sheet nailing assembly. Vertically reciprocative nailing chucks are disposed above the workpiece in side-by-side pairs to position nails on the abutting edge portions of the sheet material. Associative reciprocative drive means force the nails into the sheet material and the selected transverse frame member disposed therebelow.

6 Claims, 9 Drawing Sheets

METHOD AND APPARATUS FOR FABRICATING MODULAR BUILDING FLOOR ASSEMBLIES

TECHNICAL FIELD

The present invention relates to multi-station machinery for conveying and positioning longitudinal and transverse frame members and sheet material and for securing these elements together in sequential fashion to form a modular building floor assembly and the like, as well as to a method of employing this apparatus to fabricate the desired assembly. More particularly, the present invention relates to a method and means by which longitudinal and transverse frame members are advanced to and secured together at a frame assembly station, glue is applied to the resulting frame workpiece, and thence, one or more sheets of covering material are applied to the workplace and fastened thereon.

BACKGROUND ART

The construction of modular housing is accomplished advantageously in a factory using mass production techniques. Heretofore, the assembly line began where separate floor and wall sections were joined together. Each of these floor and wall sections, however, was constructed through the use of stationary jigs and hand-operated pneumatic nailing guns. The various frame members employed to form a floor or wall section were placed by hand in cradles or guides formed on the jigs and were nailed together with the hand-operated guns. Sheeting material was then placed on the frame and fastened thereto before hoisting the resulting building component from the jig.

The amount of physical labor involved in the above-described process was substantial. Typically, the operator was required to manipulate frame members that were eight, twelve or twenty-four feet in length and that were nominally 2×8's or 2×4's. Many of these frame members were doubled together. Sheet material such as dry wall and plywood or particleboard ranging in size from 4×8 to 12×8 feet were employed. The hand operation of nail-driving guns was also quite tiring. The results of operator fatigue were low output, low product quality, and job dissatisfaction.

The closest prior art known to the inventors are U.S. Pats Nos. 3,688,965 to Kellner et al; 3,537,168 to Carroll; 3,873,015 to Whitaker; 3,968,560 to Vial; 4,305,538 to Schultz; 3,086,210 to Good et al and 3,592,376 to Moehlenpah. Each of the above-cited patents discloses automated equipment for forming various building components, particularly wall sections. However, the means of positioning the workpiece during the sequential operations has, heretofore, been a problem. The problem is particularly acute downstream of the frame-forming station, particularly where edge portions of two adjoining pieces of sheet material need to be positioned over a single frame member and secured in place by fasteners extending into the adjoining edges and the frame member.

The present invention automates substantially the entire floor assembly process, thereby defining a new beginning for the conventional housing module assembly line. In contrast to the above-cited prior art, the present invention provides a pair of workpiece indexing devices that carry the frame workpiece to a precise position where sheet material is placed and, thence, to a precise position on a sheet nailing device. Additional means for insuring that the sheet material is properly positioned and for holding the combined sheet material and workpiece frame in place while the nailing process are also provided.

SUMMARY AND OBJECTS OF THE INVENTION

The present invention is an improvement in a building component fabricating apparatus for sequentially forming a floor assembly and the like, wherein the fabricating apparatus includes framing means for forming a workpiece from a plurality of transverse frame members secured at selected intervals between a pair of laterally spaced apart, longitudinal frame members and workpiece guide means extending downstream from the framing means. The subject improvement comprises a first indexing device disposed downstream of the framing means for positioning the workpiece to receive a plurality of sheets of covering material in such a manner that abutting edge portions of adjacent sheets are disposed over a selected transverse frame member; a sheet-fastening station disposed downstream of the guide means and including stop means for releasably engaging the selected transverse frame member and a fastener driving assembly equipped with a pair of fastener-positioning chucks disposed in side-by-side relation to one another for securing the abutting edge portions of adjacent sheets of covering material to the selected transverse frame member; and second indexing means disposed between the workpiece guide means and the sheet-fastening station for advancing the workpiece to and for releasably holding the selected transverse frame member against the stop means of the sheet-fastening station.

In addition, the present invention represents an improvement in a method of forming a building floor assembly and the like, which method includes forming a workpiece by securing a plurality of transverse frame members at selected intervals between a pair of laterally spaced apart, longitudinal frame members and guiding the workpiece downstream from the framing operation. The improvement comprises: carrying the workpiece to a precise position under a sheet-placing station downstream of the framing station; placing a sheet of covering material on a selected portion of the workpiece; advancing a selected transverse frame member and releasably holding the selected transverse frame member against stop means mounted on a sheet-fastening station; and securing an edge portion of the covering material to the selected frame member with a fastener-positioning chuck disposed on the sheet-fastening station above the stop means.

A primary object of the present invention is to provide a method and apparatus of forming a building floor assembly and the like which substantially reduces the amount of physical labor heretofore required to fabricate such a building component.

Another object of the present building floor assembly fabricating apparatus and method is to mass produce floor assemblies and the like for the production of modular housing and other modular building products.

A further object of the present invention is to improve the quality and precision of floor assemblies and similar building components formed thereby.

Yet another object of the present invention is to provide floor assembly fabricating apparatus and method for precisely positioning a frame workpiece so that abutting edge portions of adjacent sheets of covering material are disposed over a transverse frame member.

Still another object of the present invention is to provide means for precisely positioning the workpiece so that fasteners are driven into abutting edge portions of adjacent sheets of covering material and into a transverse frame member disposed below the abutting edge portions.

Further objects and advantages of the present invention may be more readily understood in view of the following drawings and detailed description of the preferred embodiment.

A. Overview

Figure 1:
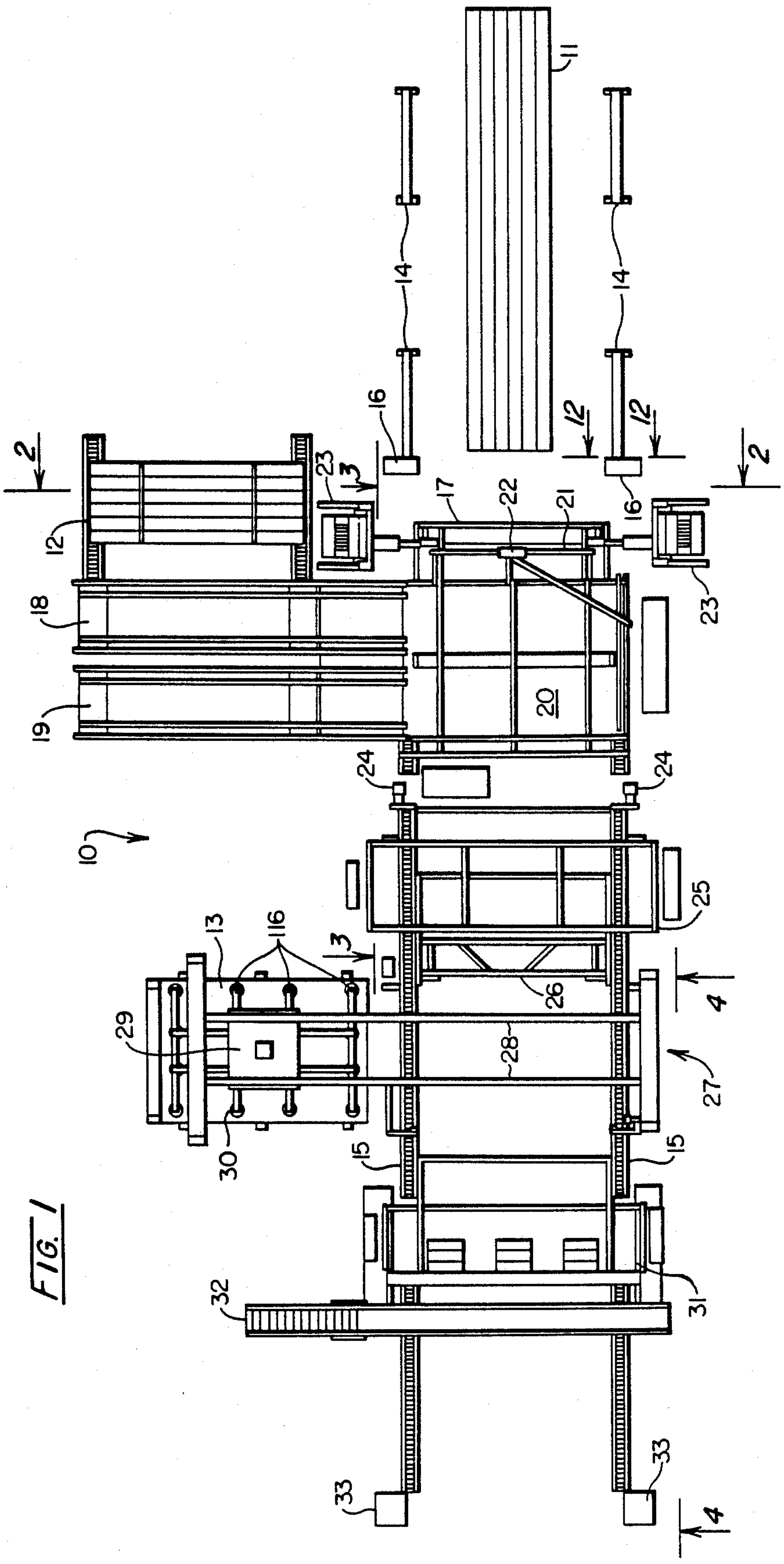
FIG. 1 is a top plan view of the present invention and includes diagrammatic representations of the infeed means for longitudinal and transverse frame members, the frame assembly station, the glue applying station, the sheet-placing station, the sheet-fastening station and their components.

Referring to FIG. 1, the present building component fabricating apparatus, generally designated 10, is employed to assemble a pair of laterally spaced apart, longitudinal frame members 11 and a plurality of transverse members 12 into a frame structure to which sheets of decking or covering material 13 are secured, preferably to form a floor assembly. Laterally spaced apart pairs of beam-supporting infeed cradles or troughs 14 are floor mounted at the entrant end of the apparatus to properly position the longitudinal members 11. Said longitudinal members are formed advantageously from pairs of elongated beams or band boards and are placed in each of the relatively opposing cradles 14. Said cradles are axially aligned with a pair of longitudinally extending guide rails 15 which support and guide the longitudinal frame members 11 through a substantial portion of the machine. Infeed drive units 16 are disposed at the ends of the side beam cradles 14 adjacent to a frame assembly table or station 17. The relatively opposing pairs of band boards 11 are advanced to and through the frame assembly station by the infeed drive units 16.

The transverse frame members or joists 12, however, are infed to the frame assembly table 17 by a different route. A lower sweep assembly 18 and an upper sweep assembly 19 extend lateraly outwardly from one side of the frame assembly table. In the usual manner, intermediate joists are cut to a length which permits them to be mounted between the relatively opposing side beams 11. End joists are slightly longer than their intermediate counterparts and are intended to extend to the outer edges of the side beams 11. A supply of end joists are placed below the upper sweep assembly 19, and a plurality of intermediate joists are stacked below the lower sweep assembly 18. Each stack of joists is arranged in horizontally and vertically aligned rows, and a horizontally disposed layer is moved laterally by each of the upper and lower sweep assemblies onto a two-tiered diverter table 20. An upper level of the diverter table receives the end joists from the upper sweep assembly 19, and the lower diverter table receives the intermediate joists from the lower sweep assembly 18. Each level of the diverter table 20 is provided with drive means for moving the joists toward off-loading brackets 21 disposed above the assembly table 17. An operator lifts a joist from the appropriate off-loading bracket and positions it on said assembly table. An automatic nailing assembly 23 is disposed on each side of the assembly table to drive nails into portions of the side beam and joist aligned with the nailing assembly. After each joist is secured at opposite ends to the side beams, the frame workpiece being formed thereby advances incrementally, so that the operator may place another joist at the assembly station for nailing.

The frame workpiece moves downstream solely by means of the infeed drive units 16 until the leading end of the workpiece reaches intermediate or outfeed drive units 24. The various drive units act cooperatively to advance the workpiece until the trailing ends of the band boards or side beams advance beyond the infeed units.

Downstream of the intermediate drive units 24 is a gluing station 25 which includes a pair of stationary glue guns, each disposed above one of the side beam guide rails 15, and a laterally reciprocating gun mounted on an overhead carriage. Disposed below and partially downstream from the gluing station 25 and below the guides 15 is a frame indexer 26 which advances the frame workpiece to a deck-placing station 27.

The deck or sheet-placing station 27 comprises a pair of overhead guide rails 28 on which a deck elevator or hoist 29 moves laterally. At the lower end of said deck elevator is a spider-like sheet-gripping device 30.

Once the decking or covering material 13 has been placed on a leading portion of the frame, said leading portion advances to a deck or sheet-fastening station 31.

The sheet-fastening station extends transversely between the side beam guide rails 15, and an overhead catwalk 32 lies immediately downstream of the sheet-fastening assembly 3 for servicing and supplying said apparatus with nails. Final drive assemblies 33 are disposed downstream of the catwalk to advance the floor assembly further along the assembly line.

B. Longitudinal Frame Member Infeed Means;

As indicated in FIG. 1, a supply of side beams or band boards 11 are preferably stacked between the cradles 14, so that they are relatively accessible to an operator standing at the frame assembly station 17. The side beams are nominally 2×8 boards and are typically twenty-four feet long, although the apparatus is readily adaptable to other sizes of lumber. Preferably, a pair of beams are placed together in side-by-side, facing relationship to form a composite longitudinal frame member 11.

The operator separately maneuvers two of the side beams 11 into each of the axially aligned pairs of infeed cradles 14. Said cradles are stationary, floor-mounted troughs having openings at opposite ends thereof. Advantageously, antifriction rollers may be disposed in the bottom of each cradle to facilitate the movement of the longitudinal frame member therethrough.

Figure 12:
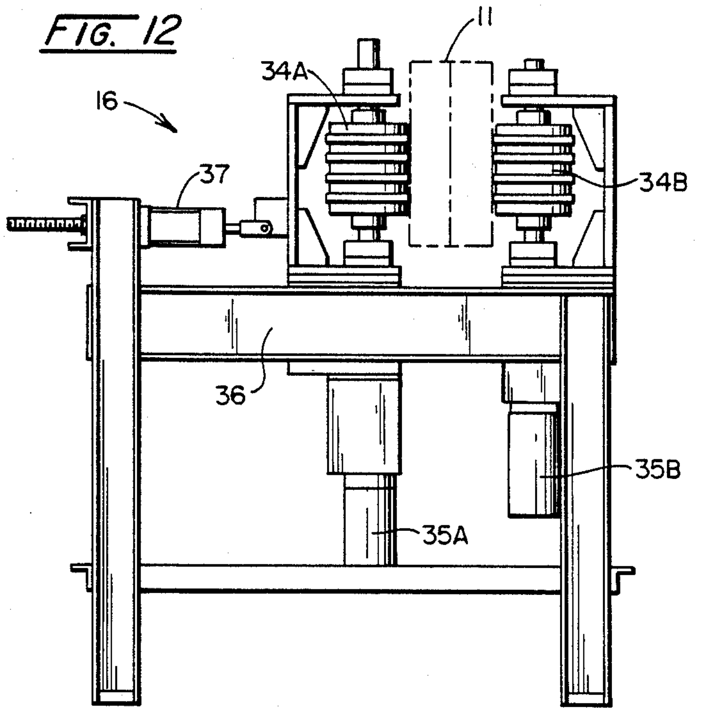
FIG. 12 is an enlarged vertical sectional view taken along line 12—12 of FIG. 1 and particularly illustrates one of the infeed drive units for the longitudinal frame members.

A laterally spaced apart infeed drive unit 16 is mounted at the end of each of the cradles 14 closest to the frame assembly table 17. Referring to FIG. 12, each drive unit comprises a pair of relatively spaced apart, lumber-gripping rollers 34A and 34B that are driven by hydraulically-actuated motors 35A and 35B, respectively. The outboard roller and motor assembly 34A, 35A is slidably mounted on a floor-mounted supporting frame 36, and the inboard roller and motor assembly 34B, 35B is fixedly mounted on the frame 36. The outboard assembly shifts laterally towards and away from the composite side beam 11, which is disposed between the rollers 34A and 35B by virtue of the positioning provided by the axially aligned cradles disposed upstream therefrom. Lateral movement of the outboard assembly is accomplished by an air-actuated piston and cylinder assembly 37 mounted on an outlying portion of the frame 36. In this manner, the infeed drive units not only provide a motive force for moving the side beams 11 through the frame assembly station, they also hold the beams together and maintain them in alignment with the beam-clamping devices, described below, on the frame assembly table C. Transverse Frame Member Infeed Assemblies.

Figure 2:
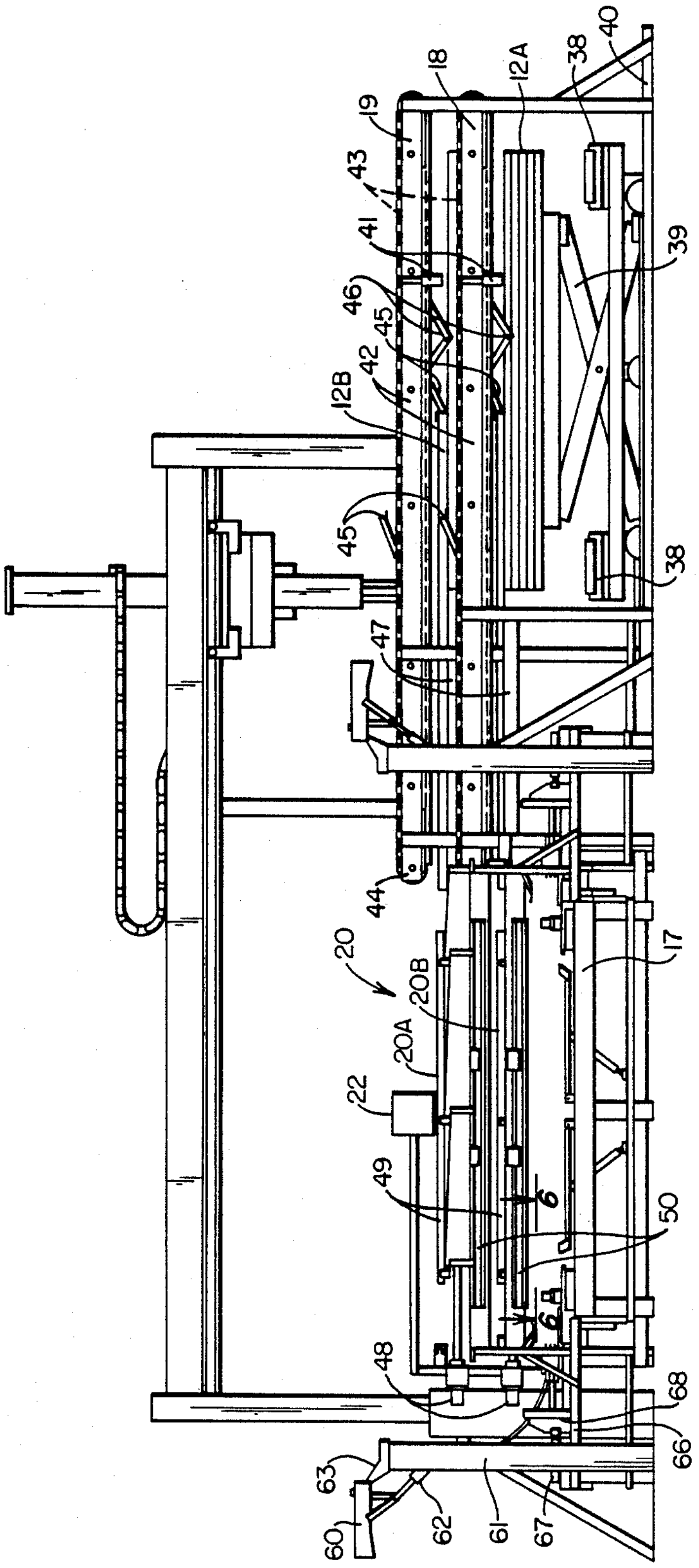
FIG. 2 is an enlarged vertical sectional view taken along line 2—2 of FIG. 1 and particularly illustrates one of the joist lift tables, the sweep members and the frame assembly station.

Referring to FIG. 2, the relatively shorter transverse frame members or intermediate joists 12A are supplied in bundles to the lower sweep assembly 18 on relatively spaced apart antifriction conveyors 38 to a hydraulically actuated lift table 39, which is positioned between the inner ends of the joist conveyors 38 and below the lower sweep assembly 18. The lift table elevates the bundle of joists automatically as the top horizontal layer is swept laterally onto a lower platform 20B of the diverter table, generally designated 20. A second hydraulically actuated lift table (not shown) is disposed below the upper sweep assembly 19, and a cart or truck (not shown), having an open base through which the second lift may pass, supplies the relatively longer transverse members or end joists 12B to said upper sweep assembly. Preferably, a guide track 40 is provided on the floor below the upper sweep to assist in guiding the cart into the proper position.

The two-tiered sweeps 18 and 19 and the two-tiered diverter table 20 provide proper separation between the end and intermediate joists. Preferably, all of the joists are nominally 2×8 boards; however, as may be readily understood, the intermediate joists 12A disposed between the side beams are approximately six inches shorter than the end joists 12B which span the ends of the longitudinal frame members. Typically, the intermediate joists 12A are approximately 11 feet 4 and ¾'s inches long and are conveyed to the diverter table 20 via the lower sweep assembly 18, and the end joists 12B are approximately twelve feet long and are conveyed to the diverter table via the upper sweep assembly 19. It is also possible to provide double end joists, i.e., two joists which are glued, stapled or otherwise secured in side by side, facing relation, to the frame assembly table 17 via the upper sweep 19. Typically, such double end joists include an outer joist spanning the ends of the side beams and an inner joist disposed between the beams.

An electric eye 41 is mounted on each of the sweep assemblies 18 and 19 to signal the control system for the hydraulically actuated lift tables 39 to elevate the joist supply incrementally after each layer of lumber is advanced to the diverter table 20.

Each of the upper and lower sweep assemblies 18 and 19 is formed with a pair of relatively spaced apart, horizontally disposed frame members 42 between which a pair of elongated chains 43 are driven by a hydraulically actuated motor 44. Extending between the chain drives on each assembly are a pair of joist-engaging sweep bars 45, which are attached to the chain links by pivotal bracket members 46. The sweep bars are mounted on the chain one-half of the distance around the chain from each other. Roller assemblies and associated bracketing 46 are also provided to assist in the controlled movement of a layer of joists to the diverter 20. In operation, the sweep bars 45 are positioned so that, as they reach a lower position on the sweep assembly, they engage the upper layer of joists and urge them towards the diverter 20. Upper and lower platforms 47 are disposed, respectively, between the lower sweep assembly 18 and the lower diverter table 20B and between the upper sweep assembly 19 and the upper diverter table 20A. The lower and upper platforms are located at approximately the same heights as the top layers of intermediate and end joists, respectively, and thereby provide support as the joists are pushed to their respective diverter tables.

Figure 3:
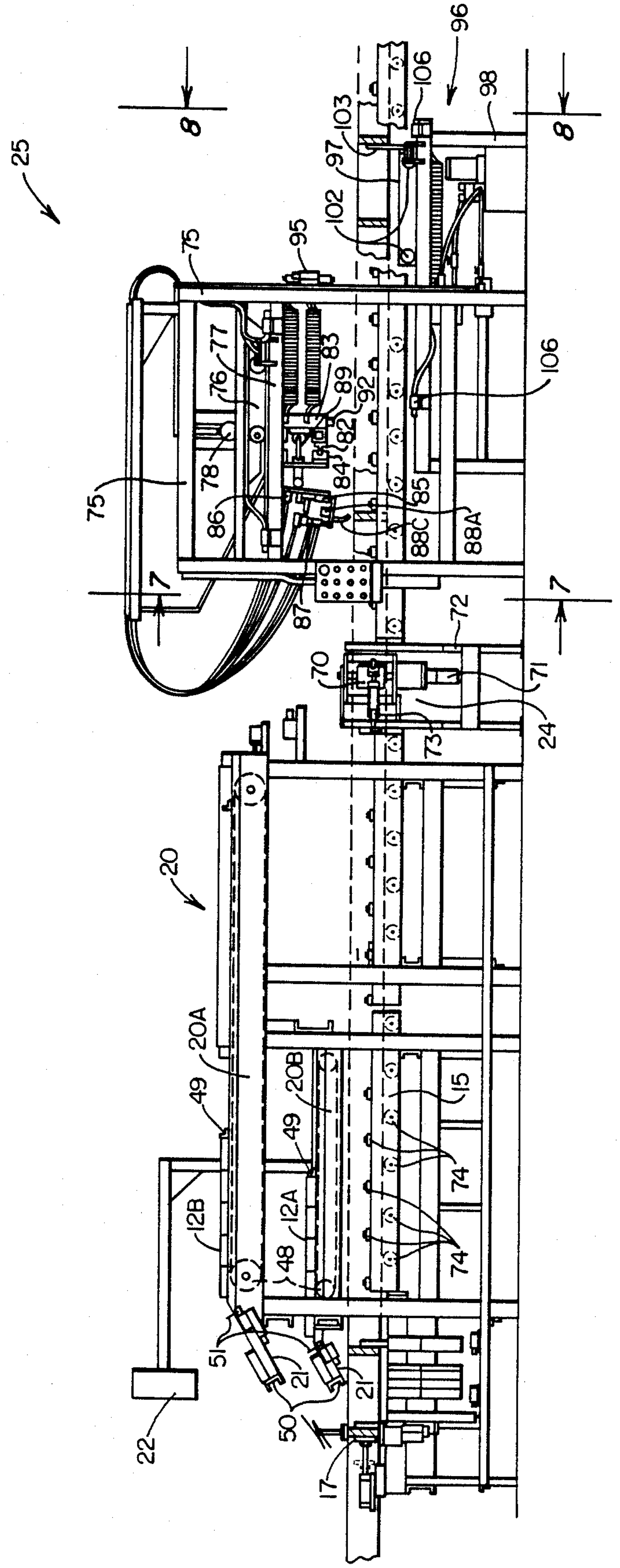
FIG. 3 is an enlarged vertical sectional view taken along line 3—3 of FIG. 1 and particularly illustrates the joist diverter table, outfeed drive unit, gluing station and first indexer.

As indicated in FIGS. 2 and 3, the diverter assembly, generally designated 20, is formed with upper and lower platforms or tables 20A and 20B, respectively. The upper diverter platform receives the end joists 12B from the upper sweep assembly, and the lower diverter platform receives the intermediate joists 12A from the lower sweep assembly. Each of the diverter tables includes a chain driven conveyor mechanism equipped with a hydraulically-actuated motor 48. Attached to the chain drives are elongated, upwardly projecting bars 49 that engage the last joist in each row and urge said joist rows towards the front of their respective platforms 20A and 20B.

As best indicated in FIG. 3, the front ends of the platforms are formed with downwardly inclined arms or brackets 21. Horizontally extending stop bars or ledges 50 are formed at the ends of the off-loading arms 21. Limit switch probes 51 are provided at the junctures of the platforms 20A and 20B and their respective inclined arms 21. When a joist passes these probes 51, a signal is sent to the control system to stop the diverter table conveyors, thereby preventing additional joists from sliding down the arms 21 and abutting against the joists being held in place by the ledges 50 and positioned for the operator to lift them onto the frame assembly table 17.

Figure 5:
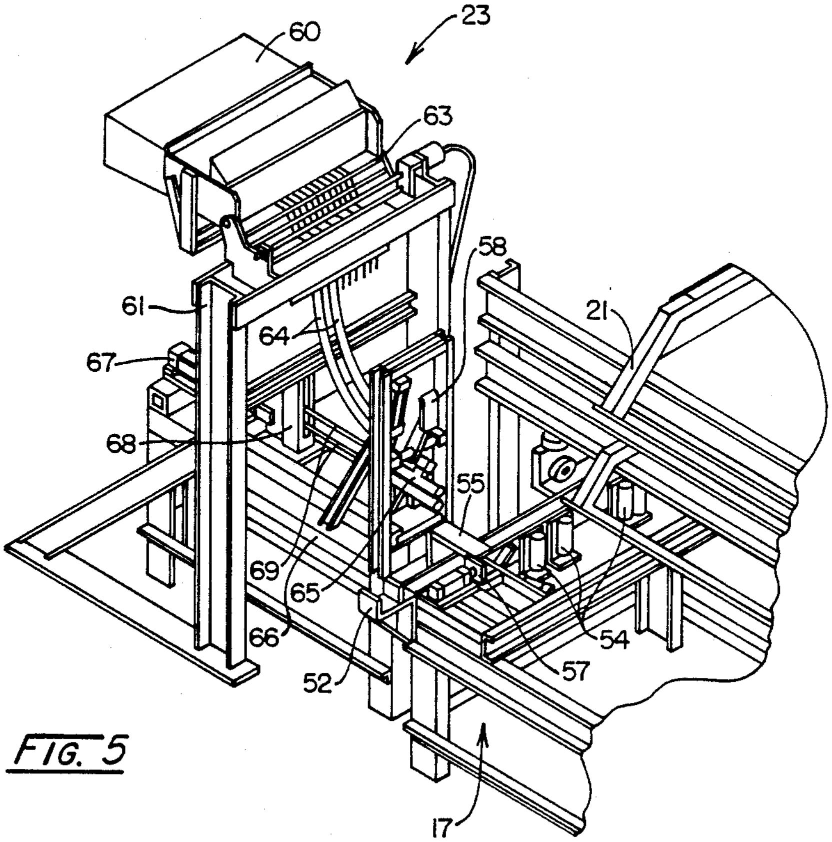
FIG. 5 is an enlarged, fragmentary perspective view of one of the frame nailing assemblies and a portion of the frame assembly table.

D. Frame Assembly Table;

As indicated in FIGS. 1 and 2, the assembly table 17 is a relatively open transversely extending framed structure whose operative components are disposed primarily on relatively opposing lateral portions thereof. These opposing lateral portions are substantially identical, so only one will be described in detail. Referring to FIG. 5, a rearwardly projecting bracket 52 is mounted at the end of the table for receiving one end of an elongated end joist. The operator signals the infeed drive unit 16 (FIG. 14) through the control panel 22 (FIG. 2) to advance one of the longitudinal frame members 11 until it reaches the end joist disposed in the bracket 52. The operator drives nails through the end joist and into the beam, preferably with a hand-operated nailing gun, and then signals the control system, via control panel 22, to activate and deactivate the infeed drive units 16 in the manner described below.

Sensing devices which provide input to the control system as to the position of the joists comprise a plurality of infrared scanners or electric eyes 53 (FIG. 6) that "see" each successive joist as it passes thereabove. After calculating the input signals from the scanners 53 and the instructions provided by the operator and a microprocessor as to the desired distance between joists, the control system signals an appropriate air-actuated piston and cylinder assembly 54 to elevate the piston, thereby engaging the joist and signals the infeed drives to stop advancing the side beams.

Figure 6:
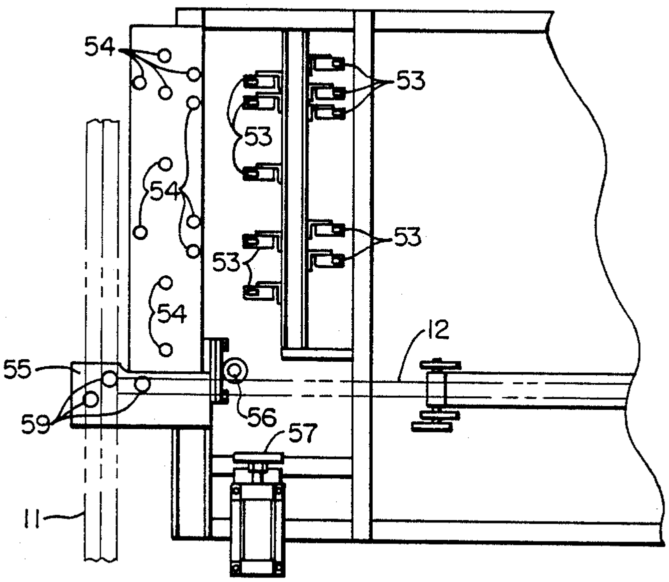
FIG. 6 is an enlarged, fragmentary top plan view of a portion of the frame assembly table shown in FIG. 5.

The operator then lifts one of the intermediate joists from the lower supply bracket 50 on the diverter and positions it on a platform or anvil 55 (FIG. 5). A plurality of clamping and positioning devices are then actuated. Referring alternately to FIGS. 5 and 6, a vertically oriented, positioning pin 56 elevates to prevent the joist from advancing. An air-actuated clamp plate 52 elevates and advances to urge the joist against the pin 56. An air-actuated top flusher 58 pivotally mounted on a stationary framework descends and provides a downward force against contiguous portions of the side beam and joist. A set of three air-actuated anvil pins 59 extend upwardly and urge the adjoining composite beam and joist upwardly against the flusher foot 58. At this point, the frame members are held securely in place and are ready to be nailed together.

E. Automatic Nailing Apparatus.

The nailing assemblies 23 are laterally disposed relative to the anvils 53 on opposite sides of the framing table 17. Referring to FIG. 5, each nailing assembly comprises a nail pan 60 pivotally mounted on a vertically extended framework 61. An air-actuated piston and cylinder assembly 62 (FIG. 2) raises and lowers the nail pan to shift the nails contained therein towards a nail picking module 63. A plurality of feed tubes 64 extend from the picking component 63 to an equal number of chuck members 65. The nailing chucks are slidably mounted on a stationary bench 66 disposed below the vertically extended support 61. An air-actuated piston and cylinder assembly (not shown) is mounted on the bench 66 below the nailing chucks 65 and advances the chucks toward and away from the side beams 11. Extending laterally outwardly from and mounted on the nailing bench 66 is a hydraulically actuated piston and cylinder assembly 67 which provides the motive force for a laterally reciprocative driving bar 68. A plurality of driving pins 69 extend from the driving bar to the nailing chucks 65. Once the clamping and positioning devices have secured the beam and joist in position over the anvil 55, the control system actuates the piston/cylinder assembly which advances the chucks against the side wall of the beam. The control system then actuates the nailing piston/cylinder assembly 67 which advances the driving bar and, hence, the driving pins 69. Said pins advance into their respective chucks and force the nails in said chucks into the beam and joist. Preferably, four driving pins and nailing chucks are provided on each nailing assembly. The hydraulic ram 67 and air-actuated ram (not shown) are then retracted, thereby withdrawing the pins 69 from the chucks, and withdrawing the chucks from the beam.

The nail pan 60 is pivoted or shifted up and down substantially continuously during operation in order to properly feed the nail picker 63. When the driving pins are withdrawn from their respective chucks, new nails move from the feed tubes into the chucks.

Once the chucks are withdrawn, the infeed drive units 16 reverse direction for a brief interval, thereby drawing the beam and attached joist rearwardly a short distance. In this manner, the joist-positioning pins 54 and 56 no longer engage the joist and are able to drop back into their respective cylinders. The infeed drive units then advance the beams and the attached joist until the selected scanner 53 provides a signal to the control system to raise the appropriate joist pin 54. The operator then places another joist on the anvil 55, and the control system again actuates the clamping and positioning devices.

In addition to the above-described joist position stops 54 mounted in relatively close proximity to the nailing assemblies, there are a series of relatively opposing pairs of air-actuated stops (not shown), each disposed on one of the side rails 15, preferably at eight, sixteen and twenty-four feet intervals from the anvil 55. These outlying stops engage the leading end of the workpiece and thereby insure that the joists placed eight, sixteen and twenty-four feet from the leading end of the frame are accurately located. Otherwise, cumulative errors could arise from positioning a joist solely on the basis of its distance from the preceeding joist. Such an error would adversely affect the placement and attachment of decking material, as discussed below in connection with the sheet placing and fastening assemblies.

As indicated in FIG. 1, laterally spaced apart outfeed drive units 24 are preferably provided downstream from the frame assembly table to assist in advancing the frame structure along the guide rails 15. Referring to FIG. 3, each of the outfeed or intermediate drive units includes a beam-engaging rotary drum 70 driven by a hydraulic motor 71. Said motor/drum assembly is pivotally mounted on a stationary frame 72 for lateral movement towards and away from the adjacent side beams by means of an air-actuated cylinder 73.

As further indicated in FIG. 3, the movement of the workpiece through the framing and subsequent downstream operations is assisted by antifriction members 74 rotatively mounted on the upper edge and lower ledge of the elongated side beam guides 15.

F. Glue-Applying Assembly

Figure 7:
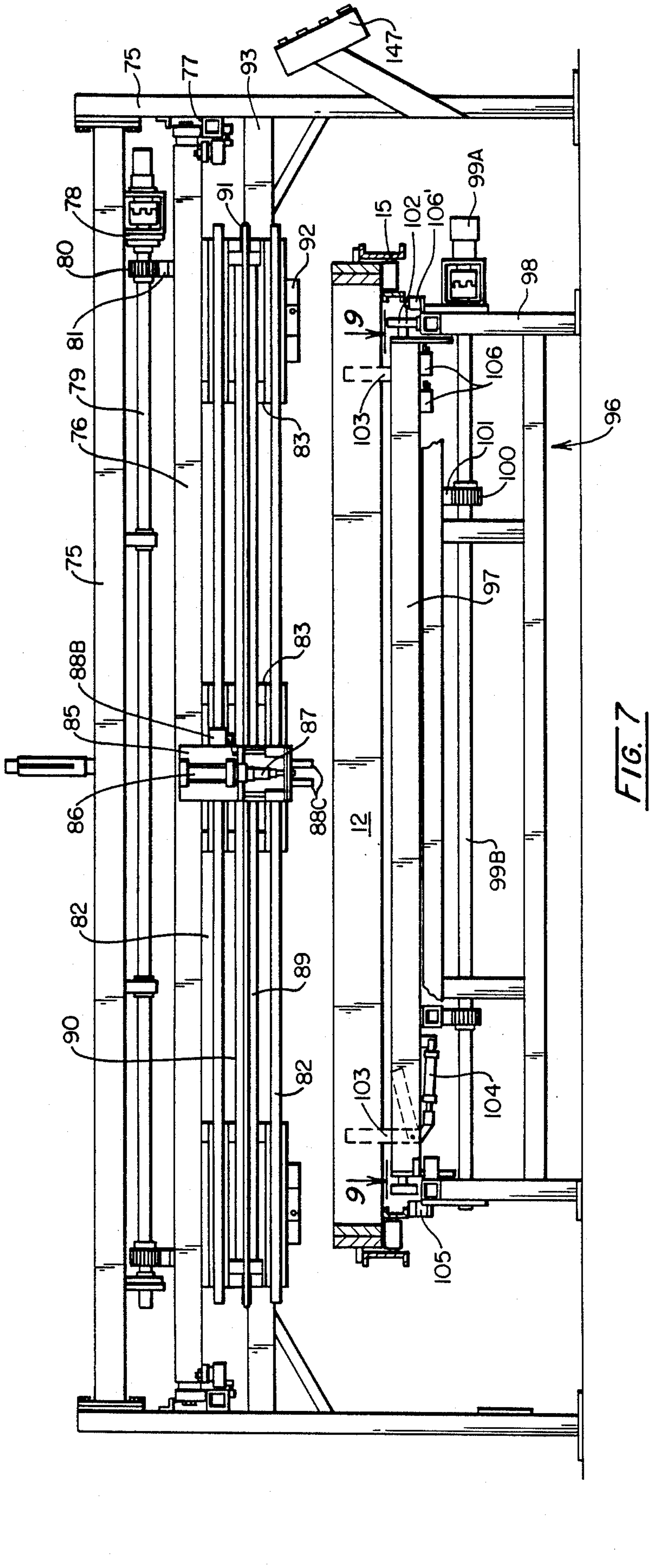
FIG. 7 is an enlarged vertical sectional view taken along line 7—7 of FIG. 3 and particularly illustrating the glue-applying station and the frame indexer.

As indicated in FIG. 3, the glue-applying assembly, generally designated 25, is disposed above the workpiece guide rails 15 downstream of the outfeed drive units 24. The gluer assembly includes a stationary overhead frame 75 formed with a pair of vertical members disposed laterally outwardly from each of the guide rails and with a pair of horizontal members extending between laterally opposing pairs of vertical members. As indicated in FIGS. 3 and 7, a rack or carriage 76 is movably mounted at laterally opposing ends of the frame 75 on tracks 77 extending between the pairs of vertical frame members. Upstream and downstream movement of the carriage 76 is powered by a hydraulically actuated motor 78 which rotates an elongated, transversely extending shaft 79. The drive shaft 79 is provided with a pair of laterally spaced apart gears 80 that mesh with a pair of longitudinally extending gear racks 81 rigidly mounted on the carriage 76.

A pair of laterally extending, horizontally disposed, vertically spaced apart linear bearings 82 are mounted on downwardly projecting posts 83 of the carriage 76. Slidably mounted upon the linear bearings 82 are a pair of bearing blocks 84. A segmented platform 85 is pivotally connected to an arm extending from a plate between the bearing blocks 84. An air-actuated piston/cylinder unit 86 is mounted on an upper segment of the platform 85 and controls the vertical movement of a lower segment of the platform, upon which a nozzle or glue applicator 87 is mounted. An electric eye or scanner 88A (FIG. 3) is mounted on the lower segment of the platform, and a proximity switch 88B (FIG. 7) is mounted on the upper segment. A pair of guide bars 88C project downwardly from the lower segment and are disposed to abut against one side of the joist as glue is being applied.

Disposed between the linear bearing shafts is a rodless or cable cylinder 89 mounted on the carriage posts 83. A cable 90 extends from opposite ends of the rodless cylinder around pulleys 91 to the gluing platform 85. In the usual manner, the cylinder 89 provides the driving force which moves the platform laterally upon the bearing shafts 82.

A pair of laterally spaced apart electric eyes or infrared scanners 92 are mounted at opposite ends of the carriage 76 at substantially the same height as the glue nozzle 87 when the lower platform segment has descended. When the workpiece advances so that a joist is directly below the platform scanner 88A, a signal is transmitted by the scanner to the control system to initiate the gluing process. The piston/cylinder assembly 86 lowers the nozzle-bearing segment of the platform 85. The motor 78 moves the carriage 76 downstream a short distance and then back upstream until the lower platform guide bars 88C engage the joist 12. The cable cylinder 89 drives the platform 85 to one lateral end of the carriage. The scanner 92 at the end to which the platform is shifted signals its presence. The control system then opens a valve (not shown) that permits glue to be applied by the nozzle 88 to an upper surface of the joist 12 as the platform moves therealong. The scanner 92 at the opposite end of the carriage signals the control apparatus when the platform reaches the end of the joist, whereupon the glue valve is shut and the lower segment of the platform is raised to permit the glue-covered joist to advance.

Figure 8:
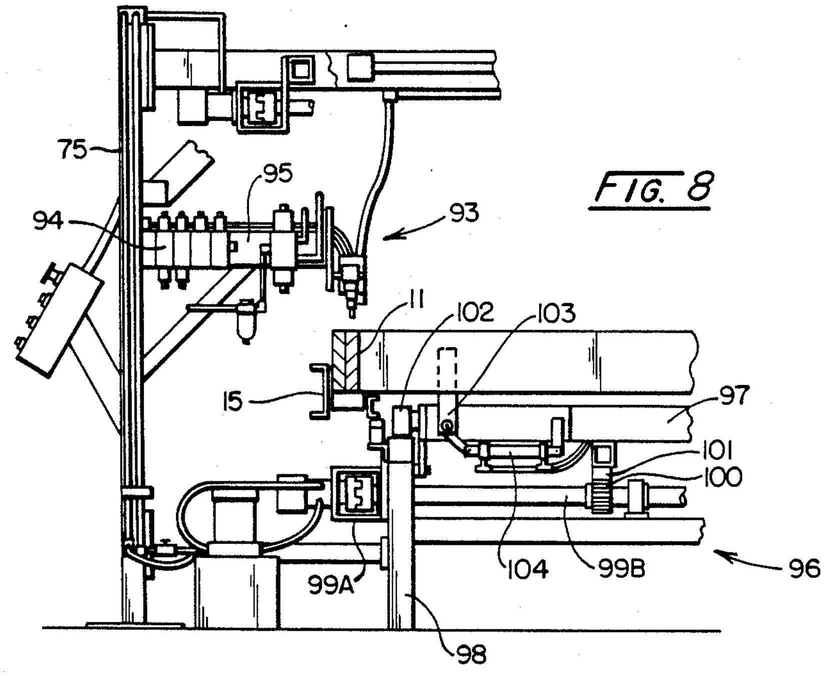
FIG. 8 is an enlarged vertical, sectional, fragmentary view taken along line 8—8 of FIG. 3 particularly illustrates one of the stationary glue-applying assemblies and a portion of the frame indexer.

As indicated in FIG. 8, a stationary gluing gun, generally designated 93, is mounted over the guide rail 15 in alignment with the longitudinal frame member 11 of the workpiece. A similar gluing gun is mounted on the opposite side of the frame over the other longitudinal frame member, as partially shown in FIG. 7. Application of glue by the stationary guns 93 is keyed to signals provided by limit switches (not shown) which detects the presence of side beams below the gluing guns 93 and the outfeed drive units 24. The control system processes these signals so that a series of manifold valves 94 controlling the flow of glue through the stationary guns do not open unless the side beams are below the guns and the workpiece is being advanced by the drive units 24. The manifold valves 94 and the stationary gun 93 are mounted upon an arm 95 projecting laterally inwardly from the gluing station mounting frame 75. As indicated in FIG. 3, the mounting arm 95 and gun 93 are disposed on a vertical frame member relatively downstream from the laterally movable joist gluing gun 87.

G. Frame Indexing Apparatus.

As indicated in FIG. 3, movement of the workpiece downstream from the gluing station 25 is provided by a hydraulically-actuated indexing device, generally designated 96. The frame indexer 96 includes a carriage 97 which moves upstream and downstream, preferably a distance of approximately six feet, upon a stationary, floor-mounted support structure 98. A hydraulically actuated motor 99A (FIGS. 7 and 8) is mounted on the support structure, and a drive shaft 99B extends from the motor to the laterally opposing side of the table. A pair of laterally spaced apart gears 100 are mounted on the drive shaft and are disposed to mesh with the teeth of a pair of laterally spaced apart racks 101 mounted on the underside of the carriage 97. The carriage is supported on the table 98 by laterally opposing pairs of rotatably mounted cam followers 102.

Pivotally mounted on the leading end of the carriage 97 are a pair of laterally spaced apart dogs or indexing arms 103. Each dog 103 moves from a relatively retracted, horizontal position to a joist-engaging vertical position by means of an air-actuated piston/cylinder assembly 104. An electric eye or infrared scanner 105 (FIG. 7) is attached to the carriage laterally outwardly from one side thereof in alignment with the pivotal dogs 103 for sensing the presence of a joist overhead. A plurality of limit switches 106 are mounted on the carriage 97 for sensing the positions of the Pivotal arms 103 and the position of the carriage 97 relative to the frame 98.

H. Sheet Material Placing Assembly.

Disposed downstream from indexer 96 and gluing apparatus 25 is the deck placing assembly, generally designated 27 in FIG. 1. The overhead tracks 28 are supported by a series of relatively spaced apart pillars 108A and elevated cross members 108B (FIG. 4) disposed outwardly of opposite lateral sides of the guide rails 15. As further indicated in FIG. 4, an air-actuated piston/cylinder assembly 109 is mounted in a stationary frame 110 above the frame workpiece and indexer 96. A truck 111 supplies sheet material 112 to a placing apparatus loading station located laterally outwardly from one of the guide rails. Guide rails 113 define the loading station and provide means whereby the supply truck 111 may be properly positioned for removal of the sheet material by the elevator or hoist 29. Preferably each sheet of covering or decking material is three-quarter inch waferboard that is twelve feet long and eight feet wide. Since the frame is usually twelve feet by twenty-four feet, more than one sheet of decking material 112 is needed to cover the entire frame. In any event, it is essential for the sheet material to be properly positioned on the frame workpiece. For this purpose, the deck or sheet placing assembly is provided with several positioning devices described below. Likewise, the frame indexer 96 is positioned and constructed to advance the workpiece in precise fashion. Further, as indicated in the description of the downstream workpiece stops, the joists located eight, sixteen and twenty-four feet from the leading end of the workpiece are separately positioned. As a result of the actions of these components on the workpiece, abutting edges of adjacent sheets of decking material are located directly over a centerline through the upper surfaces of the joists disposed therebelow. Positioning stops 114A and 114B are provided on the framework 108A of the sheet-placing assembly, as well as adjacent to the workpiece guide rail 15 disposed on the opposite side from the supply truck 111. A deck-engaging assembly 115 lifts a single sheet of material from the truck 111 and shifts it laterally to a position over the frame workpiece. In its elevated position, the sheet of material abuts against the upper positioning stop 114A. An air-actuated piston/cylinder unit (not shown) drives a vertically reciprocating plate or foot (not shown) in an area adjacent to the upper stationary stop 114A. The air-actuated plate assists in maintaining the sheet material in position as the deck-engaging assembly 115 lowers it towards the workpiece frame disposed therebelow. The lower positioning stop 114B projects upwardly from and is disposed outwardly of the guide rail 15, and assists in positioning a leading edge of the sheet material 13 on the frame. The piston/-cylinder assembly 109 is provided with a sheet-engaging bracket at a free, reciprocative end thereof. Said bracket is disposed to push the sheet material, once released by the deck-engaging assembly 115, against a previously applied sheet of decking material.

The decking-engaging assembly 115 is equipped with four relatively spaced apart, parallel arms 116 (FIG. 1) that extend longitudinally in the direction of travel of the workpiece. Each arm is preferably provided with four suction devices 30 and an air driven nailing gun 117 is fastened at each lateral end arm. The nailing guns are provided to tack the sheet material in position on the side beams 11 so that when the following sheet of decking material is applied and pushed against the previous sheet by the push rod 109, the previous sheet is not forced out of position. The suction device 30 are connected by tubing (not shown) to a vacuum pump (not shown), and thus grip the sheet 13 while a pressure differential exists and release it when the vacuum is dropped.

The hydraulically-actuated deck elevator or hoist 29 is movably mounted on the overhead supporting frame and is provided with an elongated connecting rod which permits the deck-engaging rack 116 to be elevated and lowered. A chain drive system 118 moves the deck elevator laterally along the stationary frame.

Figure 9:
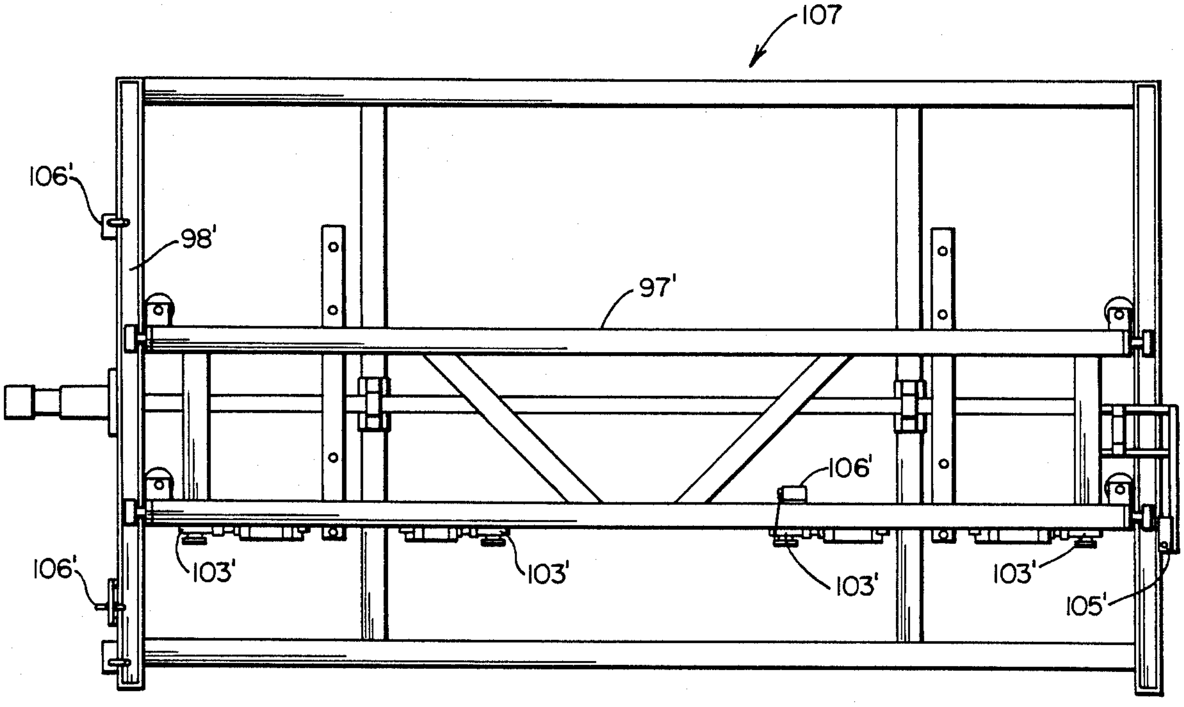
FIG. 9 is an enlarged top plan view of the assembly indexer.
Figure 11:
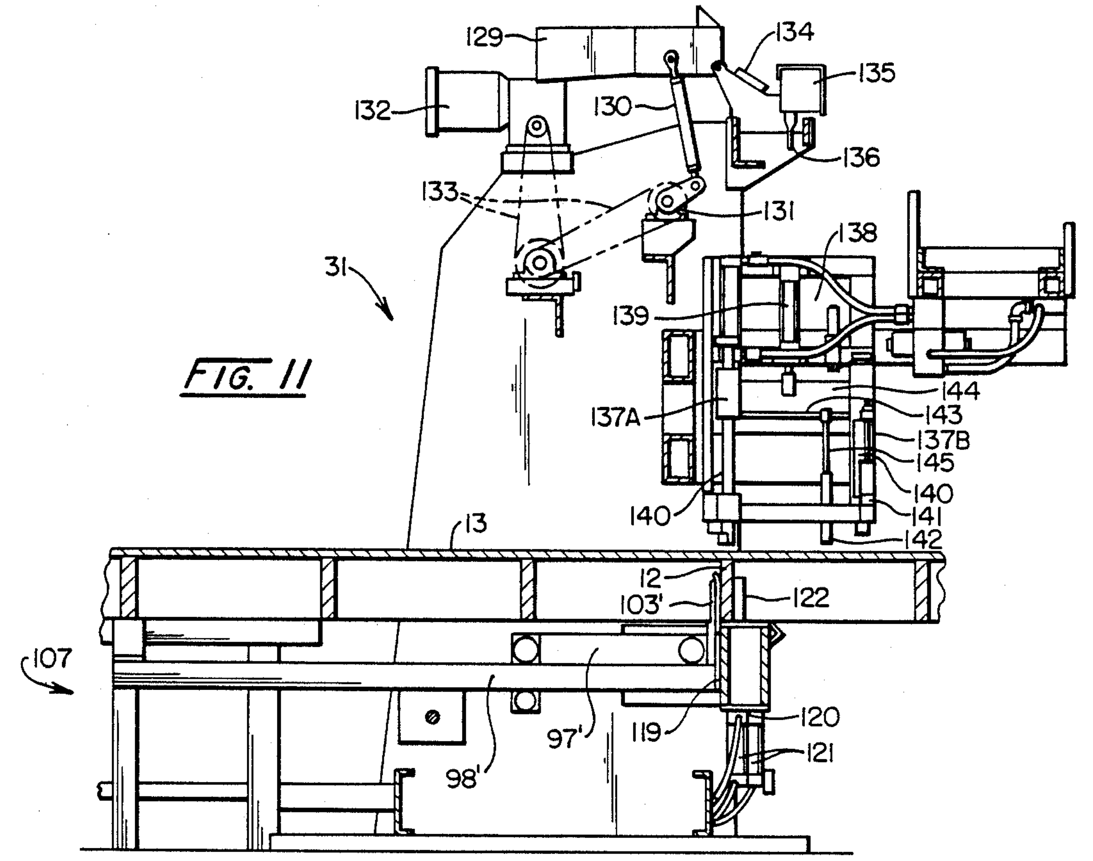
FIG. 11 is a vertical sectional view taken along line 11—11 of FIG. 10 and particularly illustrates the positional relationships between the sheet material and frame members of the workpiece, the assembly indexer and various components of the sheet nailing assembly.

H. Assembly Indexing Apparatus:

As the sheet material is being applied to a trailing portion of the workpiece, a leading portion thereof is engaged by an assembly indexing apparatus 107, as shown in FIGS. 9 and 11. The assembly indexing apparatus is substantially similar to the frame indexer 96, except that two additional pivotal dogs 103' are provided in lateral alignment with and interior to the outer dogs provided on the frame indexer. An electric eye 105' is laterally aligned with the pivotal dogs 103 and senses the presence or absence of a joist overhead. Limit or proximity switches 106' are disposed adjacent to one of the interior arms 103 to detect its position, and a pair of sensors 106' are mounted on one of the laterally disposed, horizontal members of the support structure 98 to detect the forwardmost and rearwardmost positions of the carriage 97'. The assembly indexer 107 is spaced downstream of the frame indexer 96 approximately ten feet and, as indicated in FIG. 11, advances the workpiece into the automatic nailing assembly, generally designated 31.

I. Sheet Nailing Assembly:

As indicated in FIG. 11, the carriage 97' of the assembly indexer 107 advances to a position where the joist engaging dogs 103' abut against a base or anvil portion 119 of the sheet nailing assembly 31. Four anvil assemblies 120 (FIGS. 10 and 11) are disposed in spaced lateral alignment within the base 119, and are each provided with a pair of air-actuated piston/cylinder assemblies 121. Each piston/cylinder assembly 121 includes a vertically reciprocative anvil pin 122. The anvil assemblies are positioned within the base 119 so that, when one of the anvil pins 122 of each piston/cylinder assembly is elevated, a transverse member 12 of the workpiece frame will be sandwiched between the anvil pin 122 and the pivotal arm 103' (FIG. 11) of the assembly indexer. Two anvil pins and associated drive means are provided for each anvil assembly to accommodate double thickness joists. An electric eye or scanner 123 (FIG. 10) is disposed in the base 119 in alignment with the anvil assemblies to detect the presence of a joist overhead and to determine if it is a single or double joist.

Figure 4:
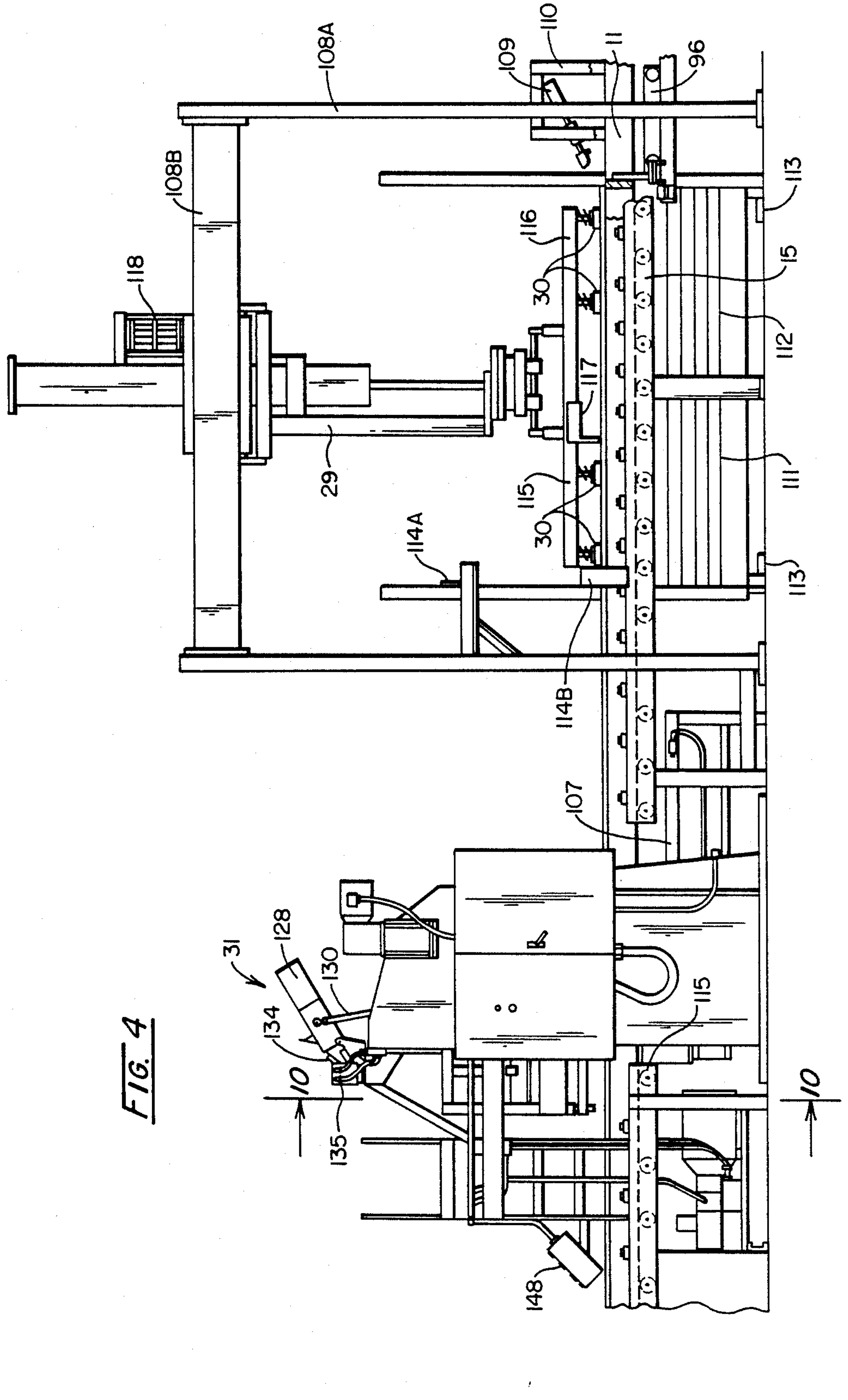
FIG. 4 is an enlarged vertical sectional view taken along line 4—4 of FIG. 1 and particularly illustrates the deck-placing station, the second indexer and the deck-nailing station.
Figure 10:
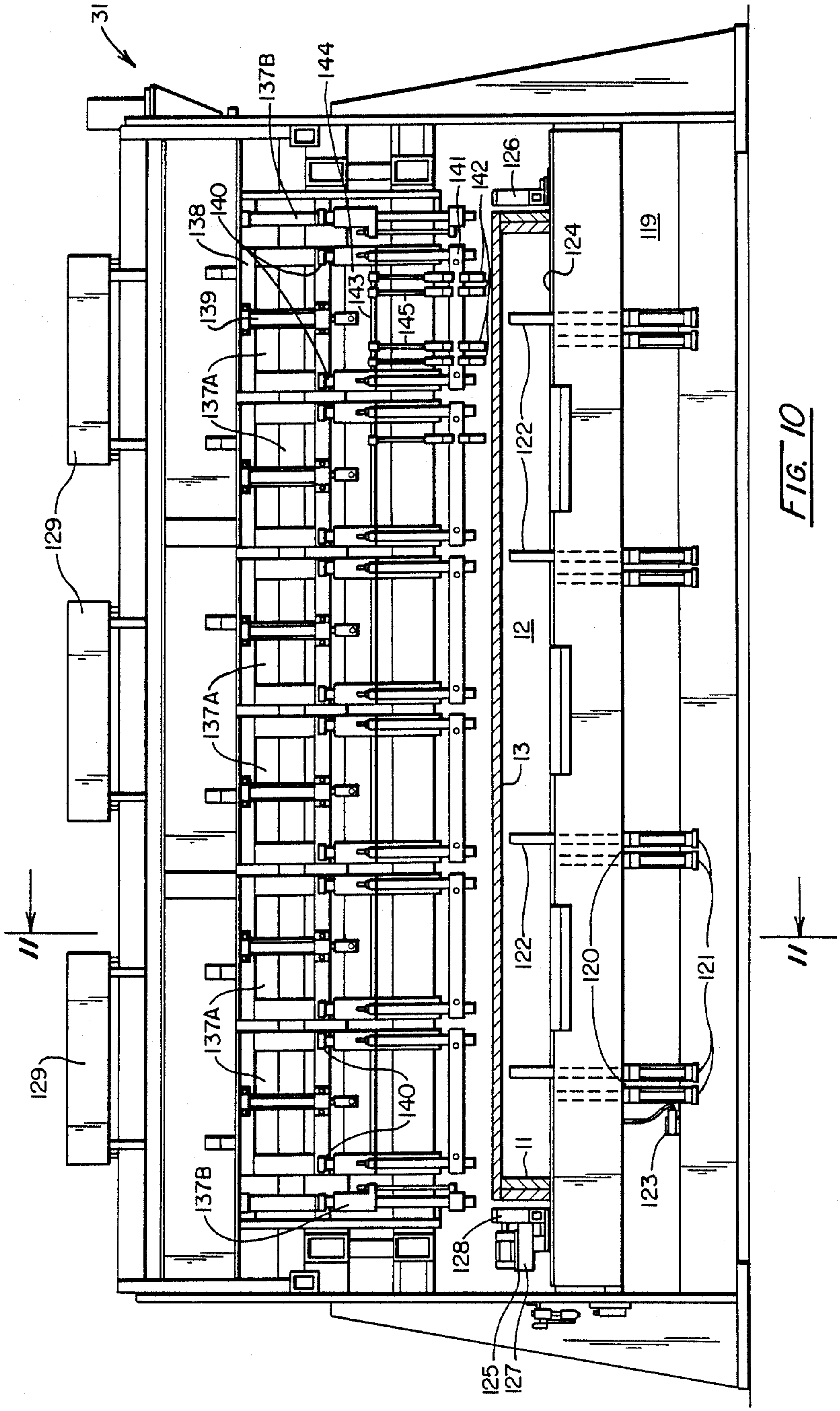
FIG. 10 is an enlarged vertical sectional view taken along line 10—10 of FIG. 4 and particularly illustrates the sheet-nailing assembly.

As indicated in FIG. 4, the guide rails 15 stop at the upstream end of the assembly indexer 119 and resume immediately downstream of a workpiece-receiving table 124 on the sheet fastener. In the space between these positions, the workpiece is carried by the indexer carriage 97' and by the table 124 defined by the upper surface of the base assembly 119. As indicated in FIG. 10, a pair of workpiece clamping devices 125, 126 are mounted on the table 124 in laterally spaced apart relation to one another so that the workpiece may pass therebetween. One of the clamping devices 125 is equipped with an air-actuated piston/cylinder assembly 127 that moves a shoe 128 attached to the free end of the piston towards and away from the workpiece. The other clamping device 126 is stationary, thereby acting as a stop member against which the adjacent longitudinal member 11 abuts when the shoe 128 extends from the reciprocating clamp member. Both clamp members are so positioned on the table 124 that a transverse frame member 12 is positioned therebetween by the anvil pins 122 and the pivotal arms 103' of the assembly indexer. Accordingly, the clamp members 125, 126 prevent the workpiece from moving laterally, while the anvil pins 122 and dogs 103' prevent it from moving upstream and downstream.

As further indicated in FIG. 10 and/or FIG. 11, fastener supplying and driving portions of the sheet fastening apparatus, generally designated 31, are mounted above the workpiece table 124. The fastener-supplying portion preferably includes three nail pans or bins 129, each of which is pivoted up and down upon forwardly disposed mounts by a connecting rod 130 that is attached to a crank shaft 131. The nail pan crank shaft 131 is rotated by an electric motor 132 whose torque is transmitted to the drive shaft by a pair of drive chain and sprocket assemblies 133. Preferably, nails (not shown) are dispensed from the three nail pans 129 into one of three nail runs 134 connected therewith and then into one of three nail pick assemblies 135 in communication with the nail runs. The nails advance from the pick assemblies through a plurality of funnels 136 and tubes (not shown) to a plurality of nail driving assemblies 137A and 137B.

The nail driving assemblies are substantially identical, so the structure described below applies to all, unless otherwise indicated. Preferably, six of the nail driving assemblies 137A are laterally aligned with the workpiece table 124, and two of the nailing assemblies 137B are disposed in laterally spaced relation to one another on opposite sides of the workpiece table 124. Each nailing assembly is equipped with an upper stationary support 138 rigidly secured to the superstructure of the nailing apparatus. A hydraulically-actuated piston/cylinder assembly 139 projects downwardly from the support 138, as do a pair of guide shafts 140. A vertically movable driver 141 is slidably mounted on the guide shafts 140 and is attached to the operative portion of the ram 139. Preferably, four nail chucks 142 are operatively connected to the driver 141. A shim plate 143 is connected at opposite ends to a head member 144 which is slidably mounted on the guide shafts 140.

In operation, the assembly indexer 107 advances the workpiece so that a joist 12 upon which adjacent edges of two sheets of decking material 13 abut is directly below the six laterally aligned nailing assemblies 137A. Each of the chucks 142 is positioned to place a nail into one or the other of the pieces of sheet material in close proximity to the edge thereof and to drive the nail into the joist disposed below the seam. The hydraulic cylinders 139 are actuated to lower the driver 141 so that the nailing chucks press against the deck material. When the downward movement of the driver 141 is arrested by the nailing chucks pressing against the sheet material workpiece, the head member and shim bar 143, 144 continue to advance downwardly, thereby forcing a driving pin 145 into each of the nail chucks 142 and driving the nails contained in the chucks into the abutting edges of the sheet material and the underlying joist. The end nail driving assemblies 137B extend downstream of and operates simultaneously with the laterally aligned nail driving assemblies 137A. Said end nailers 137B are positioned to drive nails into laterally opposing edge portions of the sheet material 13 and the longitudinal frame members 11 disposed therebelow.

Once the fasteners have been driven into the workpiece, the piston/cylinder assemblies 139 draw the head members 144 and nail chucks 142 upwardly in response to valve actuations effected by the control system. As the nail driving assemblies are raised, the joist-engaging dogs 103' are pivoted downwardly, the anvil pins 122 descend and the workpiece clamp shoe 128 is drawn laterally outwardly from the longitudinal member 11. The carriage 97' of the assembly indexer 107 moves upstream to the next joist that carries abutting edges of sheet material, the arms 103 are elevated and the cycle begins again.

J. Control System:

Actuation of the above-described components is effected by conventional combinations of switches and valves (not shown) that control the flow of hydraulic fluid, compressed air and/or electricity. Preferably, several hydraulic pumps and reservoirs are provided to drive the hydraulically-actuated motors on the infeed and outfeed drive units 16 and 24, joist sweeps 18 and 19, joist lift tables 39, deck-placing elevator 29, the reciprocating carriages on the gluing station 25 and indexers 96 and 107, and the hydraulically actuated nail-driving rams on the frame and sheet fastening assemblies 23 and 31.

Advantageously, one central source of compressed air may be used to drive the air-actuated piston/cylinder assemblies on the infeed and outfeed drive units 16 and 24, the joist-positioning clamps 57, 58 and pins 54 on the frame assembly table 17, the pivotal arms 103, 103' on the frame and assembly indexers 96, 107, the vertically movable glue nozzle Platform 85, the anvil pins 122 and the deck-positioning guides 109.

The timing and sequence of the various switching devices is controlled by computer software, firmware and hardware well known in the art. Input signals which prompt the computerized portion of the control assembly to signal the switching devices are provided by one or more operators via the control panel 22 (FIG. 3) at the frame nailing station, panel 147 (FIG. 7) at the gluing station, and panel 148 (FIG. 4) at the deck-fastening station. The control system is particularly well-suited for substantially automatic operation and for this purpose, numerous electric eyes or scanners and proximity and limit switches of conventional design are provided at the frame assembly, gluing and deck fastening stations, as well as on the frame and assembly indexers, as described above.

In view of the foregoing, it may be readily understood that the above-described apparatus and method of fabricating a building component such as a floor assembly reduces substantially the amount of time and labor required to construct a floor assembly over conventional methods and equipment. In addition, the present apparatus and method provide more precisely crafted and uniform floor assembly than heretofore possible.

While a single embodiment of the present building component apparatus has been illustrated and described in detail, the foregoing specification is not intended to limit unduly the spirit of the invention or the scope of the following claims.

We claim:

1. In building component fabricating apparatus including framing means for forming a workpiece from a plurality of transverse frame members secured at selected intervals between a pair of laterally spaced apart longitudinal frame members and further including workpiece guide means extending downstream therefrom, that improvement which comprises: reciprocative frame indexing means disposed downstream of the framing means for positioning the workpiece to receive a plurality of sheets of covering material in such a manner that abutting edge portions of adjacent sheets are disposed over a selected transverse frame member; a sheet-fastening station disposed downstream of the frame indexing means for releasably engaging the selected transverse frame member and equipped with at least one pair of fastener-positioning chucks disposed in side-by-side relation to one another for securing the abutting edge portions of adjacent sheets of covering material to the selected transverse frame member; and reciprocative assembly indexing means disposed between the frame indexing means and the sheet-fastening station for advancing the workpiece to and for releasably holding the selected transverse frame member against the sheet-fastening station.

2. Building component fabricating apparatus according to claim 1, wherein a glue-applying station is disposed generally over the workpiece guide means and the frame indexing means, said glue-applying station including first and second laterally spaced apart stationary nozzles and a third, laterally movable nozzle.

3. Building component fabricating apparatus according to claim 2, wherein a sheet-placing station is disposed generally over the workpiece guide means and the frame indexing means and between the glue-applying station and the sheet-fastening station, said sheet-placing station including a hoist for depositing a sheet of covering material onto the workpiece, alignment means for positioning said sheet relative to the transverse and longitudinal frame members of said workpiece, and tacking means for holding said sheet in position while the workpiece advances to the sheet-fastening station.

4. In a building component fabricating apparatus including framing means for forming a workpiece from a plurality of transverse frame members secured at selected intervals between a pair of laterally spaced apart longitudinal frame members and further including workpiece guide means extending downstream therefrom, that improvement which comprises:

(a) A glue-applying station disposed over the workpiece guide means downstream of the framing means and including a laterally movable nozzle for applying glue to an upper surface of each transverse frame member and a pair of stationary nozzles for applying glue to upper surfaces of the longitudinal frame members;

(b) A sheet-placing station disposed generally over the workpiece guide means downstream of the glue-applying station and including a hoist for depositing a sheet of covering material onto the workpiece and alignment means for positioning said sheet on the workpiece disposed therebelow;

(c) Reciprocative frame indexing means for positioning the workpiece under the sheet-placing station;

(d) A sheet-fastening station disposed downstream of the sheet-placing station and including stop means mounted in a base portion of said sheet-fastening station for releasably holding a selected transverse frame member, clamp means mounted on a table portion of said sheet-fastening station for releasably holding the workpiece therebetween and a plurality of nailing assemblies mounted in an upper portion of said sheet-fastening station and provided with at least one vertically reciprocative nailing chuck disposed to press the sheet material against the selected frame member disposed therebelow and to guide a nail into said sheet and frame members; and (e) Reciprocative assembly indexing means for advancing the selected transverse frame member to and for releasably holding said selected frame member against the stop means of the sheet-fastening station.

5. Building component fabricating apparatus whereby a workpiece is assembled from plurality of longitudinal and transverse frame members and at least one sheet of covering material as said workpiece moves downstream, said apparatus comprising:

(a) First infeed means for positioning and moving the longitudinal frame members;

(b) Second infeed means for positioning and moving the transverse frame members;

(c) A frame assembly table disposed downstream of the first and second infeed means for and provided with means for positioning and holding a transverse frame member between a pair of laterally spaced apart, longitudinal frame members;

(d) Frame fastening means disposed on opposite sides of the frame assembly table;

(e) Stop means disposed downstream of the frame fastening means for releasably engaging a leading edge of the workpiece to insure proper positioning of at least one selected transverse frame member;

(f) Elongate guide means extending downstream from and on opposite sides of the frame assembly table for supporting and guiding the longitudinal frame members of the workpiece; (g) Drive means for moving the workpiece along the guide means; (h) Glue-applying means disposed downstream of the frame assembly table;

(i) Hoist means disposed downstream of the glue-applying means for placing a sheet of covering material onto the workpiece;

(j) First reciprocative indexing means for positioning the workpiece relative to the hoist means;

(k) Sheet-fastening means disposed downstream of the hoist means;

(l) Second reciprocative indexing means for positioning the workpiece relative to the sheet-fastening means;

(m) Power transmitting means connecting a plurality of the aforesaid means to at least one source of power;

(n) Monitoring means for generating a plurality of workpiece location signals;

(o) Control means for receiving and processing the workpiece location signals and for generating a plurality of command signals; and (p) Switch means for receiving the command signals and for opening and closing portions of the power transmitting means.

6. In a method of forming a building component, said method including forming a workpiece at a framing station by securing a plurality of transverse frame members at selected intervals between a pair of laterally spaced apart, longitudinal frame members and guiding the workpiece downstream from the framing station, that improvement which comprises: advancing the workpiece from the framing station to a generally precise position under a sheet-placing station by means of a reciprocative frame indexing carriage; placing a sheet of covering material on a portion of the workpiece; advancing a selected transverse frame member of the workpiece to and releasably holding said selected frame member against stop means mounted on a sheet fastening station by means of a reciprocative assembly indexing carriage; and securing an edge portion of the covering material to said selected frame member with a fastener-positioning chuck disposed on said sheet-fastening station above the stop means.

* * * * *